United States Patent [19]

Taka et al.

[11] 4,010,127
[45] Mar. 1, 1977

[54] POLYETHYLENE COMPOSITION

[75] Inventors: Toshio Taka, Fujisawa; Hideaki Toda, Kawasaki, both of Japan

[73] Assignee: Showa Yuka K.K., Tokyo, Japan

[22] Filed: Oct. 10, 1975

[21] Appl. No.: 621,569

[30] Foreign Application Priority Data

Oct. 15, 1974 Japan .............................. 49-117675
Mar. 20, 1975 Japan .............................. 50-32925

[52] U.S. Cl. ............................ 260/23 R; 428/96
[51] Int. Cl.² .................................................. C08L
[58] Field of Search ............. 260/23 R, 27 R, 23 H, 260/80.3; 204/30; 117/138.8 E, 160 R; 161/216; 428/96

[56] References Cited
UNITED STATES PATENTS

| | | | |
|---|---|---|---|
| 3,055,433 | 9/1962 | Poppe et al. | 117/138.8 E |
| 3,577,372 | 4/1971 | Flanagan | 260/23 |
| 3,705,137 | 12/1972 | Sonodg et al. | 260/80.3 |

*Primary Examiner*—Melvyn I. Marquis
*Assistant Examiner*—W. E. Parker

[57] ABSTRACT

A high-molecular-weight polyethylene composition having superior processability comprising (A) 100 parts by weight of a high-density polyethylene having a density of at least 0.930 g/cc. a melt index of less than 0.1 g/10 minutes and a molecular weight distribution of not more than 10, (B) 0.1 to 5.0 parts by weight of a higher aliphatic monocarboxylic acid and/or a zinc salt thereof, and (C) 0.1 to 5.0 parts by weight of at least one compound selected from polybutene, mineral oils and epoxy plasticizers. The composition has superior processability in spite of its being based on polyethylene having a low melt index, and molded articles prepared from it have high mechanical strength. The composition is especially suitable for preparation of films.

10 Claims, No Drawings

POLYETHYLENE COMPOSITION

This invention relates to a high-molecular-weight polyethylene composition having superior processability comprising (A) a high-density polyethylene having a density of at least 0.930 g/cc, a melt index of less than 0.1 g/10 minutes and a molecular weight distribution of not more than 10, (B) a higher aliphatic monocarboxylic acid and/or a zinc salt thereof, and (C) polybutene, a mineral oil and/or an epoxy plasticizer.

High-density polyethylenes have generally been used in large tonnage in various applications as molded articles such as films, sheets, packaging containers, containers, pipes or pallets because of their superior impact strength, abrasion resistance and resistance to environmental stress cracking (these properties are further improved with increasing molecular weights of the high-density polyethylenes). However, when their melt index decreases below 0.1 g/10 minutes, that is, when their molecular weight becomes too high, they have the defect that their viscosity in the molten state increases, and their processability is markedly reduced. In particular, when such a high-density polyethylene is processed into films by extrusion through a narrow die slit, its melt elongation is extremely low and its melt tension is high. Accordingly, it is extremely difficult to mold it into films by a method in which the film is taken up under draft. Even when a film can be formed, it cannot be taken up commercially at high speed. Furthermore, the resulting film has a markedly roughened surface which causes a debased commercial value.

These defects are especially remarkable when the molecular weight distribution of the polyethylene is narrow, and therefore, very much limit the utilization of high-density polyethylenes having a melt index of as low as less than 0.1 g/10 minutes and a narrow molecular weight distribution as molding materials for various articles. In particular, it is impossible to form films from these polyethylenes by an extrusion-molding method. For this reason, polyethylenes heretofore used for the preparation of films by extrusion have been limited to those having a melt index of more than 0.1 g/10 minutes, usually at least 0.3 g/10 minutes. Films prepared from these polyethylenes having such a high melt index which represents a lower molecular weight have poor impact resistance, tear resistance, abrasion resistance and resistance to environmental stress cracking, and are not entirely satisfactory. Generally, these conventional films have a tear strength of about 3 Kg/cm in the machine direction and about 30 Kg/cm in the transverse direction, and an impact strength of about 50 Kg.cm/mm. Accordingly, films having improved quality in respect of these properties have strongly been desired. In an attempt to achieve such a desire, the use of high-density polyethylenes having such a low melt index and a narrow molecular weight distribution as a molding material has been investigated, and attempts have been made to prepare films from a composition comprising such a polyethylene and various plasticizers and slipping agents customarily used in the preparation of block-like molded articles in general. However, none of such compositions have good processability, and these attempts have failed.

We have made extensive investigations in order to improve the processability of high-density polyethylenes having a density of at least 0.930 g/cc, a melt index of less than 0.1 g/10 minutes and a molecular weight distribution of not more than 10. These investigations finally led to the discovery that a high-density polyethylene composition comprising (A) 100 parts by weight of the high-density polyethylene, (B) 0.1 to 5.0 parts by weight of a $C_{10}$–$C_{25}$ higher aliphatic monocarboxylic acid and/or a zinc salt thereof, and (C) 0.1 to 5.0 parts by weight of polybutene, a mineral oil and/or an epoxy plasticizer has superior processability and can afford molded articles having an improved surface texture.

Since the high-density polyethylene composition of this invention has superior processability, it can be molded into various articles by molding machines of any conventional type, and is especially suitable for preparation of films. When films are prepared from this composition by an extrusion method, the speed of taking up the film can be 20 to 30 meters/min. as in the conventional methods, and the maximum take-up speed reaches 50 to 60 meters/min. The properties of the resulting film are markedly superior to those of the conventional films. For example, films having a tear strength of 7 Kg/cm in the machine direction and 55 Kg/cm in the transverse direction and an impact strength of 180 Kg.cm/mm can easily be produced.

The specific high-density polyethylene used in the present invention is a homopolymer of ethylene or a copolymer of a major proportion of ethylene and a minor proportion of another α-olefin obtained by the low-pressure process (the Ziegler process) or the medium-pressure process (the Phillips process or the Standard process). Densities below 0.930 g/cc are not desirable because the resulting molded articles have reduced strength. The polyethylene should preferably have a density of 0.935 to 0.955 g/cc.

High-density polyethylenes having a melt index of more than 0.1 g/10 minutes have a low melt viscosity and good processability. However, molded articles prepared from them have low mechanical strength. The preferred melt index is 0.1 to 0.005 g/10 minutes. The molecular weight distribution of the polyethylene used in this invention is not more than 10. High-density polyethylenes having a molecular weight distribution exceeding 10 have fair processability, but molded articles prepared from them do not possess a smooth surface and tend to develop a shark skin. The preferred molecular weight distribution is 2 to 10, especially 5 to 7. The molecular weight distribution is defined by the following formula $$M_w/M_n$$

wherein $M_w$ is the weight average molecular weight and $M_n$ is the number average molecular weight, and in this invention both of $M_w$ and $M_n$ can be measured by a gel permeation chromotography (GPC).

The polyethylene as component (A) of the composition of this invention is required to have the above-specified density, melt index and molecular weight distribution. This component may be in the form of a blend. For example, it can be a blend of a polymer having a narrow molecular weight distribution and a polymer having a broad molecular weight distribution, which as a whole has a molecular weight distribution of not more than 10. For example, a blend having a molecular weight distribution of not more than 10 can be prepared by mixing polyethylene having a molecular weight distribution of 5 to 7 with polyethylene having a molecular weight distribution of 13 to 16. It has been found that when in such a blend, the constituent polyethylenes are products of different processes, for example, one prepared by the medium-pressure process and the other by the low-pressure process, the resulting composition affords molded articles having more improved properties. This synergic effect is due presumably to the fact that the micro-structures of the polyethylenes prepared by different methods are different from each other.

Component (B) used in this invention is a higher aliphatic monocarboxylic acid containing 10 to 25 carbon atoms or a zinc salt thereof. Examples of the higher aliphatic monocarboxylic acid are lauric acid, myristic acid, palmitic acid and stearic acid. The stearic acid and lauric acid are most suitable for the performance of the present invention. Examples of its zinc salt are zinc laurate, zinc myristate, zinc palmitate, and zinc stearate. The zinc stearate and zinc palmitate are especially preferred. Generally, various metal salts of higher aliphatic monocarboxylic acids are known, but it has been found that in the present invention, the zinc salts are most effective, and other metal salts cannot give the desired effect.

The amount of component (B) is 0.1 to 5.0 parts by weight, preferably 0.3 to 3.0 parts by weight, per 100 parts by weight of the high-density polyethylene (A). The higher aliphatic monocarboxylic acid and its zinc salt may be used in admixture so that the amount of the mixture is within the above-specified range. There is no particular restriction on the mixing ratio of these.

Componet (C) used in the present invention will be described.

Polybutene is a mixture consisting of polyisobutylene as a main component and traces of polybutene-1 and polybutene-2 which has a weight average molecular weight of 400 to 2,700 and a viscosity at 210° F of 40 to 28,500 centi-stokes unit.

The mineral oil may, for example, be a white mineral oil which is purified and substantially colorless, consists of a saturated aliphatic hydrocarbon as a main component and does not substantially contain an unsaturated compound or an aromatic group such as phenyl or naphthyl. The white mineral oil has a dynamic viscosity at 37.8° C. of 10 to 120 centi-stokes and is substantially non-evaporable. It boils at a temperature of at least 200° C. under an absolute pressure of 760 mmHg. Other mineral oils or rubber compounding oils having the same dynamic viscosity and boiling point as the white mineral oil can also be used. These rubber compounding oils are, for example, extended oils and processing oils usually employed in the manufacture and processing of synthetic rubbers.

The epoxy plasticizer also used as component (C) is a compound containing an epoxy group in the molecule, and includes, for example, epoxidized unsaturated oils and fats, epoxidized unsaturated fatty acid esters, epoxycyclohexane derivatives and epichlorohydrin derivatives. For the performance of this invention, epoxidized soybean oil, epoxidized linseed oil, epoxidized butyl stearate, epoxidized octyl stearate, epoxidized benzyl stearate, and epoxidized dioctyl hexahydrophthalate are most suitable.

These compounds as component (C) can be used either alone or in admixture with each other. The amount of the component (C) is 0.1 to 5.0 parts by weight, preferably 0.3 to 3.0 parts by weight per 100 parts by weight of the high-density polyethylene.

When the amount of each of components (B) and (C) is less than 0.1 part by weight, the processability of the resulting composition and the surface texture of a molded article prepared from it cannot be fully improved. On the other hand, when the amount exceeds 5.0 parts, the resulting composition is extruded extremely nonuniformly, and it is difficult to process it. Furthermore, component (C) undesirably bleeds out.

The desired remarkable effect of the high-density polyethylene composition of this invention is ascribable to the inclusion of the components (B) and (C) described above.

The high-density polyethylene composition of this invention can be obtained by mixing the components (A), (B) and (C) by conventional methods using, for example, an extruder, mixing roll, kneader, Banbury mixer, drum tumbler or continuous mixer. If desired, additives usually employed for high-density polyethylene, such as antioxidants, ultraviolet absorbers, antistatic agents, dyes or pigments can be incorporated.

The high-density polyethylene composition of this invention is molded into various articles such as films, sheets, boards, pipes, rods or hollow bottles by various conventional molding methods used in the synthetic resin industry such as calendering, extruding, injection molding or blow molding. It is especially useful for preparation of films.

The following Examples and Comparative Examples illustrate the present invention specifically. These examples are directed to the preparation of films by extrusion, and the properties of the resulting films were determined by the following methods.

Melt index: JIS K-6760
Tensile test: JIS Z-1702-1962
Tear strength: JIS Z-1702
Impact strength: Pendulum film impact test, 1 inch, hemisphere
Maximum take-up speed: The maximum speed at which the film can be taken up without breakage.

EXAMPLES 1 to 6 AND COMPARATIVE EXAMPLES 1 to 10

100 Parts by weight of high-density polyethylene (prepared by the Phillips process) having a density of 0.945 g/cc, a melt index of 0.05 g/10 minutes (temperature 190° C., a load of 2.16 Kg), and a molecular weight distribution of 5 was mixed with stearic acid and/or its zinc salt and polybutene having a molecular weight of 600 in the amounts shown in Table 1 by a drum tumbler for 10 minutes. The mixture was pelletized by an extruder with a screw diameter of 40 mm (extruding temperature of 180° to 220° C. and screw speed of 80 rpm). The pellets were made into a film by an extruder with a screw diameter of 65 mm (L/D=24, a spiral die with a diameter of 100 mm, and the screw speed of 40 to 80 rpm) at a blow up ratio of 2.0 and taken up at a take-up speed of 25 m/min. The die temperature was 200° C. The temperature of the cylinder was 170° C. at its front part, 230° C. at its middle part, and 220° C. at its rear portion. There was obtained a film having a thickness of 0.04 mm and a width of 31.4 cm.

The results are shown in Table 1.

EXAMPLES 7 to 12 AND COMPARATIVE EXAMPLES 11 to 17

The procedure of Examples 1 to 6 and Comparative Examples 1 to 10 was repeated except that high-density polyethylene having a density of 0.940 g/cc, a melt index of 0.02 g/10 minutes and a molecular weight distribution of 7 and polybutene having a molecular weight of 2,500 were used instead of the high-density polyethylene and polybutene used in Examples 1 to 6 and Comparative Examples 1 to 10.

The results are shown in Table 2.

EXAMPLE 13

The procedure of Example 3 was repeated except that lauric acid was used instead of the stearic acid used in Example 3, to form a resin composition having a melt index of 0.06 g/10 minutes. The resin composition was subjected to the same film-forming procedure as in Example 3. The film-forming ability of the composition was good, and the maximum film take-up speed was 40 meters/min. The resulting film had a smooth surface texture.

EXAMPLE 14

A resin composition having a melt index of 0.03 g/10 minutes was prepared by repeating the same procedure as in Example 8 except that zinc palmitate was used instead of the zinc stearate used in Example 8. The resin composition obtained was subjected to the same film-forming procedure as in Example 8 except that the take-up speed was changed to 20 meters/min. The film-forming ability of the composition was good, and the maximum take-up speed was 25 meters/min. The resulting film had a smooth surface texture.

EXAMPLES 15 to 29 and COMPARATIVE EXAMPLES 18 to 34

Films were formed under the same condition as in Example 1 except that each of a mineral oil (white mineral oil CP-50, with a dynamic viscosity at 37.8° C. of 75.7 centistokes) and various epoxy plasticizers (epoxidized soybean oil, epoxidized octyl stearate, and epoxidized benzyl stearate) was used instead of the polybutene in the amounts indicated in Tables 3, 4 and 5.

The results are shown in Tables 3 to 5.

EXAMPLE 30

A resin composition having a melt index of 0.06 g/10 minutes was prepared in the same way as in Example 16 except that lauric acid was used instead of the stearic acid used in Example 16. The resin composition was subjected to the same film-forming procedure as in Example 16. The film-forming ability of the composition was good, and the maximum take-up speed was 50 meters/min. The resulting film had a smooth surface texture.

EXAMPLE 31

A resin composition having a melt index of 0.06/10 minutes was prepared by repeating the procedure of Example 18 except that zinc palmitate was used instead of the zinc stearate. The resin composition was subjected to the same film-forming procedure as in Example 18. The film-forming ability of the composition was good, and the maximum take-up speed was 50 meters/min. The resulting film had a smooth surface texture.

EXAMPLES 32 AND 33 AND COMPARATIVE EXAMPLES 35 to 37

Films were prepared under the same conditions as in Examples 15 to 29 and Comparative Examples 18 to 34 except that high-density polyethylene (prepared by the medium-pressure Phillips process) having a density of 0.940 g/cc, a melt index of 0.02 g/10 minutes and a molecular weight distribution of 9, a mineral oil (white mineral oil, with a dynamic viscosity at 37.8° C. of 100 centistokes), and epoxidized linseed oil were used instead of the high-density polyethylene, mineral oil and each of the epoxy plasticizers used in Examples 15 to 29 and Comparative Examples 18 to 34.

The results obtained are shown in Table 6.

EXAMPLE 34

A resin composition having a melt index of 0.03 g/10 minutes was prepared by repeating the procedure of Examples 32 and 33 and Comparative Examples 35 to 37 except that 1.5 parts by weight of zinc stearate and 0.5 part of epoxidized dioctyl hexahydrophthalate were mixed with 100 parts by weight of the same high-density polyethylene as used in these examples. The composition was subjected to the same film-forming procedure as in Examples 32 and 33 and Comparative Examples 35 to 37. The film-forming ability of the composition was good, and the maximum take-up speed was 40 meters/minute. The resulting film had a smooth surface texture.

COMPARATIVE EXAMPLE 38

A resin composition having a melt index of 0.03 g/10 minutes was prepared by mixing 100 parts by weight of the same high-density polyethylene as used in Examples 32 and 33 and Comparative Examples 35 to 37with 1.0 part by weight of epoxidized dioctyl hexahydrophthalate and 2.0 parts by weight of magnesium stearate by the same way as in Examples 32 and 33 and Comparative Examples 35 to 37. When the resulting composition was subjected to the same film-forming procedure as in these examples, its film-forming ability was found to be poor, and the maximum take-up speed was less than 1 meters/minute. The resulting film had a shark skin.

EXAMPLES 35 to 39 AND COMPARATIVE EXAMPLES 39 to 41

These examples illustrate the case of using blended polyethylenes as component (A). The blends used were prepared by mixing polyethylenes having different molecular weight distributions and obtained by different methods, and had a molecular weight distribution of less than 10. In Comparative Example 39, however, only a single polyethylene was used and the use of components (B) and (C) was omitted.

In these examples, films were formed under the same conditions as in Example 1. The results are shown in Table 7. In the Table, [P] represents polyethylene prepared by the medium-pressure Phillips process, and [Z], polyethylene prepared by the low-pressure Ziegler process.

The results show that films prepared from compositions comprising blends of polyethylenes prepared by different processes have high impact strength.

Table 1-1

| (1) Additives and Properties | Examples | | | | | |
|---|---|---|---|---|---|---|
| | 1 | 2 | 3 | 4 | 5 | 6 |
| Stearic acid | 0.3 | 0.5 | 1.0 | 3.0 | — | 1.5 |
| Zinc stearate | — | — | — | — | 2.0 | 1.5 |
| Polybutene | 0.3 | 0.5 | 1.0 | 3.0 | 2.0 | 3.0 |
| Calcium stearate | — | — | — | — | — | — |
| Lithium stearate | — | — | — | — | — | — |
| Melt index (g/10 minutes) | 0.05 | 0.06 | 0.06 | 0.06 | 0.07 | 0.07 |
| Film-forming ability | good | good | good | good | good | good |
| Maximum take-up speed (meters/minute) | 25 | 35 | 50 | above 50 | above 50 | above 50 |
| Surface texture | good | good | good | good | good | good |
| Tensile test (M direction) | | | | | | |
| Break stress (Kg/cm²) | 410 | 450 | 440 | 420 | 440 | 400 |
| Elongation (%) | 720 | 700 | 750 | 740 | 770 | 720 |
| Tear strength | | | | | | |
| M direction (Kg/cm) | 5 | 6 | 7 | 6 | 7 | 6 |
| T direction (Kg/cm) | 45 | 50 | 55 | 50 | 50 | 55 |
| Impact strength (Kg.cm/mm) | 160 | 160 | 180 | 170 | 160 | 180 |

Table 1-2

| (1) Additives and Properties | Comparative Examples | | | | | | | | | |
|---|---|---|---|---|---|---|---|---|---|---|
| | 1 | 2 | 3 | 4 | 5 | 6 | 7 | 8 | 9 | 10 |
| Stearic acid | — | 3.0 | — | — | — | — | — | — | — | 8.0 |
| Zinc stearate | — | — | 3.0 | — | — | — | — | — | 2.0 | — |
| Polybutene | — | — | — | 3.0 | — | — | 1.5 | 1.5 | 7.0 | 2.5 |
| Calcium stearate | — | — | — | — | 3.0 | — | — | 1.5 | — | — |
| Lithium stearate | — | — | — | — | — | 3.0 | 1.5 | — | — | — |
| Melt index (g/10 minutes) | 0.05 | 0.06 | 0.06 | 0.06 | 0.06 | 0.06 | 0.06 | 0.06 | 0.08 | 0.07 |
| Film-forming ability | poor | poor | poor | poor | poor | poor | fair | fair | (2) fair | (2) fair |
| Maximum take-up speed (meters/minute) | below 1 | below 1 | below 1 | below 1 | below 1 | below 1 | 5 | 5 | above 50 | above 50 |
| Surface texture | — | — | — | — | — | — | shark skin | shark skin | (3) good | (3) good |
| Tensile test (M direction) | | | | | | | | | | |
| Break stress (Kg/cm²) | — | — | — | — | — | — | — | — | 450 | 440 |
| Elongation (%) | — | — | — | — | — | — | — | — | 700 | 720 |
| Tear strength | | | | | | | | | | |
| M direction (Kg/cm) | — | — | — | — | — | — | — | — | 6 | 6 |
| T direction (Kg/cm) | — | — | — | — | — | — | — | — | 50 | 60 |
| Impact strength (Kg.cm/mm) | — | — | — | — | — | — | — | — | 150 | 160 |

Note: (1) The amounts are part by weight
(2) There was a marked non-uniformity in extrusion.
(3) There was a bleed-out.

Table 2

| (1) Additives and properties | Examples | | | | | | Comparative Examples | | | | | | |
|---|---|---|---|---|---|---|---|---|---|---|---|---|---|
| | 7 | 8 | 9 | 10 | 11 | 12 | 11 | 12 | 13 | 14 | 15 | 16 | 17 |
| Stearic acid | — | — | — | — | 1.5 | 1.5 | — | — | — | — | — | 3.0 | — |
| Zinc stearate | 0.5 | 1.0 | 2.0 | 3.0 | — | 1.5 | — | — | — | 2.5 | 2.5 | 9.0 | 7.0 |
| Polybutene | 0.3 | 0.5 | 1.5 | 2.0 | 1.5 | 1.5 | — | 3.0 | — | 2.5 | — | — | 1.0 |
| Aluminum stearate | — | — | — | — | — | — | — | — | 3.0 | — | 2.5 | — | — |
| Magnesium stearate | — | — | — | — | — | — | — | — | — | — | — | — | — |
| Melt index (g/10 minutes) | 0.03 | 0.03 | 0.03 | 0.03 | 0.03 | 0.03 | 0.02 | 0.02 | 0.02 | 0.03 | 0.03 | 0.04 | 0.03 |
| Film-forming ability | good | good | good | good | good | good | poor | poor | poor | fair | fair | (2) fair | (2) fair |
| Maximum take-up speed (meters/min.) | 25 | 25 | 45 | above 50 | 45 | above 50 | below 1 | below 1 | below 1 | 5 | 5 | above 50 | 45 |
| Surface texture | good | good | good | good | good | good | — | — | — | shark skin | shark skin | (3) good | (3) good |
| Tensile test (M direction) | | | | | | | | | | | | | |
| Break stress (Kg/cm²) | 420 | 440 | 440 | 430 | 450 | 470 | — | — | — | — | — | 450 | 420 |
| Elongation (%) | 700 | 730 | 750 | 730 | 740 | 720 | — | — | — | — | — | 700 | 750 |
| Tear strength | | | | | | | | | | | | | |
| M direction (kg/cm) | 6 | 6 | 7 | 7 | 7 | 7 | — | — | — | — | — | 7 | 7 |
| T direction (Kg/cm) | 50 | 45 | 55 | 55 | 60 | 55 | — | — | — | — | — | 55 | 60 |
| Impact strength (Kg.cm/mm) | 160 | 160 | 170 | 160 | 170 | 170 | — | — | — | — | — | 170 | 170 |

Table 3

| (1) Additives and properties | Examples | | | | | | | | Comparative Examples | | | | |
|---|---|---|---|---|---|---|---|---|---|---|---|---|---|
| | 15 | 16 | 17 | 18 | 19 | 20 | 21 | 22 | 18 | 19 | 20 | 21 | 22 |
| Stearic acid | 0.3 | 3.0 | 1.5 | — | — | — | — | 1.0 | — | 2.0 | — | — | — |

Table 3-continued

| (1) Additives and properties | Examples | | | | | | | | Comparative Examples | | | | |
|---|---|---|---|---|---|---|---|---|---|---|---|---|---|
| | 15 | 16 | 17 | 18 | 19 | 20 | 21 | 22 | 18 | 19 | 20 | 21 | 22 |
| Zinc stearate | — | — | — | 1.0 | 0.5 | 0.5 | 1.0 | — | — | — | 1.0 | — | — |
| Mineral oil | 0.3 | 1.0 | — | 1.0 | 2.0 | — | — | 0.5 | — | — | — | 3.0 | — |
| Epoxidized soybean oil | — | — | 0.5 | — | — | 0.5 | 1.0 | 0.5 | — | — | — | — | 2.0 |
| Melt index (g/10 minutes) | 0.04 | 0.06 | 0.05 | 0.06 | 0.05 | 0.05 | 0.06 | 0.05 | 0.05 | 0.05 | 0.05 | 0.05 | 0.05 |
| Film-forming ability | good | good | good | good | good | good | good | good | poor | poor | poor | poor | poor |
| Maximum take-up speed (meters/min) | 25 | 50 | 35 | 50 | 50 | 30 | 50 | 60 | below 1 | below 1 | below 1 | below 1 | below 1 |
| Surface texture | good | good | good | good | good | good | good | good | shark skin | shark skin | shark skin | shark skin | shark skin |
| Tensile test (M direction) | | | | | | | | | | | | | |
| Break stress (Kg/cm²) | 450 | 420 | 430 | 420 | 420 | 400 | 420 | 450 | | | Unmeasurable | | |
| Elongation (%) | 720 | 690 | 700 | 740 | 720 | 710 | 720 | 700 | | | Unmeasurable | | |
| Tear strength | | | | | | | | | | | | | |
| M direction (Kg/cm) | 6 | 6 | 7 | 8 | 7 | 7 | 6 | 7 | | | Unmeasurable | | |
| T direction (Kg/cm) | 50 | 50 | 65 | 60 | 70 | 55 | 50 | 70 | | | Unmeasurable | | |
| Impact strength (Kg.cm/cm) | 160 | 180 | 160 | 150 | 160 | 150 | 140 | 160 | | | Unmeasurable | | |

Table 4

| (1) Additives and properties | Examples | | | | Comparative Examples | | | | | |
|---|---|---|---|---|---|---|---|---|---|---|
| | 23 | 24 | 25 | 26 | 23 | 24 | 25 | 26 | 27 | 28 |
| Stearic acid | 1.0 | 2.0 | — | 1.0 | — | — | — | — | 3.0 | 8.0 |
| Zinc stearate | — | — | 0.5 | 0.3 | — | — | — | — | — | — |
| Calcium stearate | — | — | — | — | — | 3.0 | 1.5 | 1.5 | — | — |
| Mineral oil | — | — | 0.5 | — | — | — | — | 1.0 | 9.0 | 2.5 |
| Epoxidized soybean oil | — | — | 0.3 | 2.0 | — | — | — | — | — | — |
| Epoxidized octyl stearate | 0.3 | 0.5 | 0.3 | 1.0 | 2.0 | — | 1.5 | — | — | — |
| Melt index (g/10 minutes) | 0.05 | 0.06 | 0.06 | 0.06 | 0.05 | 0.05 | 0.06 | 0.05 | 0.07 | 0.07 |
| Film-forming ability | good | good | good | good | poor | poor | poor | poor | (2) unstable | (2) unstable |
| maximum take-up speed (meters/minute) | 35 | 45 | 60 | 60 | below 1 | below 1 | below 1 | 5 | 50 | 50 |
| Surface texture | good | good | good | good | shark skin | shark skin | shark skin | shark skin | good | good |
| Tensile test (M direction) | | | | | | | | | | |
| Break stress (Kg/cm²) | 430 | 450 | 430 | 420 | | | Unmeasurable | | | |
| Elongation (%) | 720 | 740 | 730 | 730 | | | Unmeasurable | | | |
| Tear strength | | | | | | | | | | |
| M direction (Kg/cm) | 8 | 9 | 7 | 6 | | | Unmeasurable | | | |
| T direction (Kg/cm) | 45 | 60 | 55 | 60 | | | Unmeasurable | | | |
| Impact strength (Kg.cm/mm) | 160 | 160 | 160 | 160 | | | Unmeasurable | | | |

Table 5

| (1) Additives and properties | Examples | | | Comparative Examples | | | | | |
|---|---|---|---|---|---|---|---|---|---|
| | 27 | 28 | 29 | 29 | 30 | 31 | 32 | 33 | 34 |
| Stearic acid | 2.5 | — | 0.5 | — | — | — | — | — | — |
| Zinc stearate | — | 0.3 | 0.5 | — | — | — | — | 2.0 | 7.0 |
| Lithium stearate | — | — | — | — | 2.0 | 1.5 | 1.5 | — | — |
| Mineral oil | — | — | 0.5 | — | — | 1.0 | — | — | — |
| Epoxidized soybean oil | — | — | — | — | — | — | 1.5 | 7.0 | 1.0 |
| Epoxidized benzyl stearate | 1.0 | 1.0 | 0.5 | 2.0 | — | — | 1.5 | — | — |
| Melt index (g/10 minutes) | 0.06 | 0.05 | 0.06 | 0.05 | 0.05 | 0.05 | 0.05 | 0.07 | 0.06 |
| Film-forming ability | good | good | good | poor | poor | poor | poor | unstable | unstable |
| Maximum take-up speed (meters/min.) | 60 | 50 | 60 | below 1 | below 1 | below 1 | below 1 | 50 | 50 |
| Surface texture | good | good | good | shark skin | shark skin | shark skin | shark skin | good | good |
| Tensile strength (M direction) | | | | | | | | | |
| Break stress (Kg/cm²) | 440 | 430 | 450 | | | Unmeasurable | | | |
| Elongation (%) | 730 | 710 | 700 | | | Unmeasurable | | | |
| Tear strength | | | | | | | | | |
| M direction (Kg/cm) | 7 | 8 | 7 | | | Unmeasurable | | | |
| T direction (Kg/cm) | 50 | 55 | 60 | | | Unmeasurable | | | |
| Impact strength (Kg.cm/mm) | 180 | 140 | 170 | | | Unmeasurable | | | |

Table 6

| (1) Additives and properties | Examples | | Comparative Examples | | |
|---|---|---|---|---|---|
| | 32 | 33 | 35 | 36 | 37 |
| Stearic acid | 1.0 | — | — | — | — |
| Zinc stearate | — | 1.0 | — | — | — |
| Mineral oil | 1.0 | — | — | 1.0 | — |
| Epoxidized linseed oil | — | 1.0 | — | — | 1.5 |
| Aluminum stearate | — | — | — | 1.0 | — |
| Magnesium stearate | — | — | — | — | 1.5 |

Table 6-continued

| (1) Additives and properties | Examples | | Comparative Examples | | |
|---|---|---|---|---|---|
| | 32 | 33 | 35 | 36 | 37 |
| Melt index (g/10 minutes) | 0.03 | 0.03 | 0.02 | 0.03 | 0.03 |
| Film-forming ability | good | good | poor | poor | poor |
| Maximum take-up speed (meters/min.) | 40 | 40 | below 1 | below 1 | below 1 |
| surface texture | good | good | shark skin | shark skin | shark skin |
| Tensile test (M direction) | | | | | |
| Break stress (Kg/cm²) | 440 | 440 | Unmeasurable | | |
| Elongation (%) | 720 | 700 | Unmeasurable | | |
| Tear strength | | | | | |
| M direction (Kg/cm) | 8 | 8 | Unmeasurable | | |
| T direction (Kg/cm) | 45 | 50 | Unmeasurable | | |
| Impact strength (kg.cm/mm) | 160 | 170 | Unmeasurable | | |

Table 7

| Polyethylenes, additives and properties | | Examples | | | | | Comparative Examples | | |
|---|---|---|---|---|---|---|---|---|---|
| | | 35 | 36 | 37 | 38 | 39 | 39 | 40 | 41 |
| Polyethylene | ($M_w/M_n$) | | | | | | | | |
| [P] MI 0.03 | 6 | 50 | 70 | 90 | 70 | 20 | — | 70 | — |
| [Z] MI 0.04 | 13 | — | — | 10 | 30 | — | — | 30 | 30 |
| [Z] MI 0.03 | 7 | 50 | 30 | — | — | 80 | 100 | — | 70 |
| Stearic acid | | 1.0 | 0.5 | 1.0 | — | — | — | — | — |
| Zinc stearate | | — | 0.5 | — | 0.5 | 3.0 | — | — | — |
| Polybutene | | 0.5 | — | 1.0 | 0.3 | 2.0 | — | — | — |
| Melt index (g/10 minutes) | | 0.03 | 0.03 | 0.04 | 0.03 | 0.03 | 0.03 | 0.04 | 0.04 |
| Film-forming ability | | good | good | good | good | good | poor | poor | poor |
| Maximum take-up speed (meters/min.) | | 40 | 40 | above 50 | above 50 | above 50 | Unmeasurable | | |
| Surface texture | | good | good | good | good | good | shark skin | shark skin | shark skin |
| Tensile test (M direction) | | | | | | | | | |
| Break stress (Kg/cm²) | | 450 | 480 | 470 | 490 | 430 | Unmeasurable | | |
| Elongation (%) | | 680 | 660 | 700 | 690 | 680 | Unmeasurable | | |
| Tear strength | | | | | | | | | |
| M direction (Kg/cm) | | 5 | 7 | 7 | 7 | 5 | Unmeasurable | | |
| T direction (Kg/cm) | | 70 | 60 | 50 | 60 | 80 | Unmeasurable | | |
| Impact strength (Kg.cm/mm) | | 200 | 220 | 200 | 240 | 170 | Unmeasurable | | |

What we claim is:

1. A high-molecular-weight polyethylene composition having superior processability which consists essentially of:
   A. 100 parts by weight of a high-density polyethylene having a density of at least 0.93 g/cc, a melt index of less than 0.1 g/10 minutes and a molecular weight distribution, $M_w/M_n$, of not more than 10,
   B. 0.1 to 5.0 parts by weight of a $C_{10}$–$C_{25}$ aliphatic monocarboxylic acid and/or a zinc salt thereof, and
   C. 0.1 to 5.0 parts by weight of at least one compound selected from the group consisting of polybutene, mineral oils and epoxy plasticizers.

2. The composition of claim 1 wherein the amount of each of components (B) and (C) is 0.3 to 3.0 parts by weight.

3. The composition of claim 1 wherein the polyethylene as component (A) has a density of 0.935 to 0.955, a melt index of 0.1 to 0.005 g/10 minutes and a molecular weight distribution of 2 to 10.

4. The composition of claim 3 wherein the polyethylene has a molecular weight distribution of 5 to 7.

5. The composition of claim 1 wherein component (B) is selected from the group consisting of stearic acid, lauric acid, palmitic acid, and zinc salts of these acids.

6. The composition of claim 1 wherein component (C) is polybutene having a weight average molecular weight of 400 to 2,700.

7. The composition of claim 1 wherein component (C) is a white mineral oil.

8. The composition of claim 1 wherein component (C) is selected from the group consisting of epoxidized soybean oil, epoxidized linseed oil, epoxidized butyl stearate, epoxidized octyl stearate, epoxidized benzyl stearate and epoxidized dioctyl hexahydrophthalate.

9. The composition of claim 1 wherein the polyethylene as component (A) consists of polyethylene having a molecular weight distribution of 5 to 7 and polyethylene having a molecular weight distribution of 13 to 16.

10. A polyethylene film prepared by extrusion molding of the composition of claim 1 and having an impact strength of at least 120 Kg.cm/mm.

* * * * *

UNITED STATES PATENT OFFICE
CERTIFICATE OF CORRECTION

Patent No. 4,010,127    Dated March 1, 1977

Inventor(s) Toshio Taka, Et al.

It is certified that error appears in the above-identified patent and that said Letters Patent are hereby corrected as shown below:

Table 1-2, Col. 8, In the heading Comparative Examples, The number "10" should be centered over the number "8.0".

Table 1-2, Col. 8, Note (1), "part" should read --parts--.

Table 1-2, Col. 7, Below the entry "(3) There was a bleed-out." insert -- The same meanings are attached to these figures in the following tables.--

Signed and Sealed this

Thirty-first Day of May 1977

[SEAL]

Attest:

RUTH C. MASON  
*Attesting Officer*

C. MARSHALL DANN  
*Commissioner of Patents and Trademarks*